(12) United States Patent
De Vos et al.

(10) Patent No.: US 8,231,444 B2
(45) Date of Patent: Jul. 31, 2012

(54) METHOD AND APPARATUS FOR FILLETING POULTRY OR POULTRY PARTS

(75) Inventors: Ferdinand Allard De Vos, Oostzaan (NL); Pieter Willem Vonk, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 60 days.

(21) Appl. No.: 13/099,892

(22) Filed: May 3, 2011

(65) Prior Publication Data
US 2011/0275298 A1 Nov. 10, 2011

(30) Foreign Application Priority Data
May 4, 2010 (NL) ...................................... 2004662

(51) Int. Cl.
*A22C 17/00* (2006.01)
(52) U.S. Cl. ...................................................... 452/136
(58) Field of Classification Search .................. 452/125, 452/127–130, 54, 153–155, 165, 187–189, 452/166–169, 185, 170
See application file for complete search history.

(56) References Cited

U.S. PATENT DOCUMENTS

| | | | |
|---|---|---|---|
| 4,688,297 A | | 8/1987 | Bartels |
| 5,545,083 A | * | 8/1996 | Bargele et al. ................ 452/136 |
| 6,736,717 B1 | * | 5/2004 | Annema et al. ............... 452/172 |
| 6,935,942 B1 | * | 8/2005 | Evers et al. ................... 452/157 |
| 7,344,436 B2 | * | 3/2008 | Hayakawa et al. ........... 452/135 |
| 7,344,437 B2 | * | 3/2008 | Van Den Nieuwelaar et al. ............................. 452/187 |
| 7,357,707 B2 | * | 4/2008 | de Vos et al. ................. 452/136 |
| 7,614,941 B2 | * | 11/2009 | van den Nieuwelaar et al. ............................. 452/185 |
| 7,824,251 B2 | * | 11/2010 | van den Nieuwelaar et al. ............................. 452/185 |
| 2009/0170417 A1 | | 7/2009 | Janssen et al. |

FOREIGN PATENT DOCUMENTS

| | | |
|---|---|---|
| EP | 0 756826 A2 | 2/1997 |
| EP | 1 574 133 A1 | 9/2005 |

OTHER PUBLICATIONS

Search report for NL 2004662, dated Feb. 9, 2011.

* cited by examiner

*Primary Examiner* — Richard Price, Jr.
(74) *Attorney, Agent, or Firm* — Dority & Manning, P.A.

(57) ABSTRACT

A method and system for filleting poultry or poultry parts is provided, which can include a conveyor system incorporating carriers for the poultry or poultry parts, with at least one processing station provided in or along the path of the conveyor system for processing the poultry or poultry parts. The processing station can be a cutting instrument that is placed behind a fillet scraper, and is embodied with a knife having a cutting-edge or cutting edges for cutting loose tissue connections that have remained between the carcass of the poultry or poultry part and its inner and outer fillets after passing the fillet scraper.

18 Claims, 6 Drawing Sheets

METHOD AND APPARATUS FOR FILLETING POULTRY OR POULTRY PARTS

FIELD OF THE INVENTION

The invention relates to a method and apparatus for filleting poultry or poultry parts, such as chickens or chicken parts.

BACKGROUND OF THE INVENTION

EP-B-1 454 531 discloses a known filleting system and method for filleting poultry. It is known from EP-B-1 454 531 that the processing station that is used in the filleting system is selected from the group comprising at least one skinner, one wishbone remover, one fillet scraper, one breastbone scraper and a cutter for halving breast fillets. This means that at least one of the mentioned particular types of operational devices may be selected as a processing station to be used in the filleting system.

Although the method of operation of the filleting system according to EP-B-1 454 531 is quite satisfactory in the obtained results with regard to quality of the harvested meat, it is an object of the instant invention to further improve the quality and grade of the breast fillets and/or breast fillet halves and/or front halves that are harvested with this type of process and with this type of filleting system.

US2009/0170417 discloses a method for filleting and a filleting system for poultry or poultry parts, such as chickens or chicken parts, comprising a conveyor system or line incorporating carriers for the poultry or poultry parts, with at least one processing station provided in or along the conveying path of the conveyor system or line for processing the poultry or poultry parts, wherein the processing station is a cutting instrument that is placed following a fillet scraper, and is embodied with a cutting-edge or cutting edges for cutting loose tissue connections that have remained between the carcass of the poultry or poultry part and it's inner and outer fillets after passing the fillet scraper. Similar systems are known from U.S. Pat. No. 4,688,299, EP-A-0 756 826 and EP-A-1 574 133.

SUMMARY OF THE INVENTION

Objects and advantages of the invention will be set forth in part in the following description, or may be obvious from the description, or may be learned through practice of the invention.

The present invention provides a method for filleting poultry and a filleting system or apparatus for filleting having features as set forth, for example, in one or more of the appended claims.

According to a first exemplary embodiment of the invention the cutting instrument is placed next to the path of the carriers and includes two cutting edges, each extending away from the conveying path of the carriers. The cutting edges converge towards and into each other at a far end from the conveying path of the carriers.

The filleting system of the invention ensures the cutting loose of the tissue connections that have remained between the carcass of the poultry or poultry part and it's inner and outer fillets after a scraping action, which basically loosens to an initial extent the inner and outer fillets from the carcass of the poultry or poultry part. The construction of the cutting instrument provides that upon presentation of the poultry to the cutting instrument, the first cutting edge of the two cutting edges is operative on the remaining tissue connections between the carcass and the inner and outer fillet on a first part of the carcass while passing the processing station. Subsequent thereto, the second cutting edge of the cutting edges can become operative on the remaining tissue connections between the carcass and the inner and outer fillet on a second part of the carcass, which second part is adjacent to the first part of the carcass.

Practice has proven that best results can be obtained when initially only the remaining tissue connections between the carcass and the inner and outer fillet on the first part of the carcass are cut loose and, subsequently, the remaining tissue connections between the carcass and the inner and outer fillet on the second part of the carcass are cut loose. The second part is adjacent to the first part of the carcass. In this regard, it is preferable that the carriers are rotatable, and that there are means provided to rotate the carriers at least in part while passing the processing station so as to engage initially only the remaining tissue connections between the carcass and the inner and outer fillet on a first part of the carcass with the cutting edge or cutting edges of the cutting instrument.

A further desirable feature of the method of the invention is that following the cutting loose of tissue connections between the carcass and the inner and outer fillets on both the first part and the second part of the carcass, a breastbone scraper is operated for securing a complete detachment of the fillets from the carcass. For this purpose it is preferred that, viewed in the path of the carriers, the cutting instrument is followed by a breastbone scraper.

Preferably the breastbone scraper is designed as an elongated blade disposed longitudinally and parallel to the conveying path of the carriers, and that in a cross-sectional view this blade is round and adapted to the curve of the breastbone of the poultry.

Desirably the cutting instrument and the breastbone scraper are embodied in a unitary device. This makes possible that the operation of the cutting instrument and the breastbone scraper are nicely attuned to each other. In connection therewith it is preferred that the cutting instrument is supported such that it can be tilted to a limited extent due to the operation of the cutting instrument on the poultry or poultry part. This configuration provides that during operation of the cutting instrument, and in case of a unitary device also the breastbone scraper, their orientation will automatically become attuned to the properties of the poultry or poultry part that is being processed. This prevents undue damage to the harvested meat, and effectively avoids that bone splinters will get into the meat due to the operation of the cutting instrument and/or the breastbone scraper. For this purpose it is also a preferable arrangement that the cutting instrument is provided with means for balancing the instrument, preferably a counterweight.

The possibility of tilting the cutting instrument can be suitably arranged by having the cutting instrument mounted to the fixed world with a hinge connection.

The invention is also embodied in a separate cutting instrument, which is capable to be used in the above elucidated method for filleting poultry and filleting system.

This cutting instrument basically has the feature that it is embodied with a cutting-edge or cutting edges for cutting loose tissue connections that have remained between the carcass of the poultry or poultry part and it's inner and outer fillets, after this poultry or poultry part has been processed by a fillet scraper in a manner known to the person skilled in the art.

According to the invention the cutting instrument has two cutting edges which converge towards and into each other and away from the instrument's outer circumference at a far end from the instrument's outer circumference.

The cutting instrument is advantageously embodied in a unitary device with a breastbone scraper.

The breastbone scraper is preferably designed as an elongated blade disposed longitudinally and parallel to the conveying path of the carriers, and in a cross-sectional view this blade is round and adapted to the curve of the breastbone of the poultry.

Further the cutting instrument preferably has a hinge connection for connecting same to a supporting construction.

Still further the cutting instrument preferably is provided with means for balancing the instrument, suitably by a counterweight.

The invention will hereinafter be further elucidated with reference to a schematic exemplary embodiment of a filleting system according to the invention, and with reference to the drawing. More specifically, these and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

In the drawing.

Whenever in the figures the same reference numerals are applied, these numerals refer to the same parts.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 1:
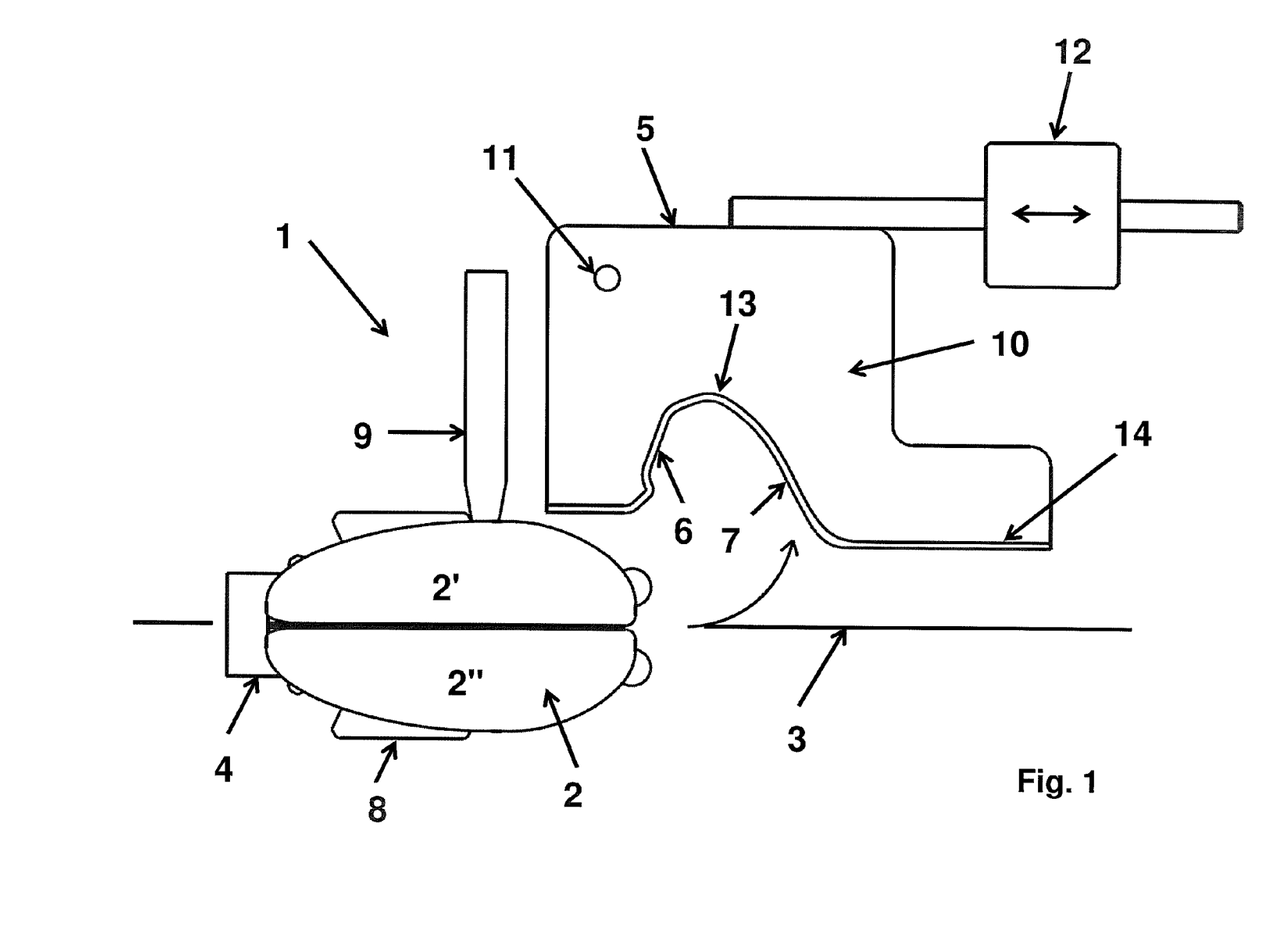
FIGS. 1-5 show the operational sequence of processing a poultry part in the filleting system of the invention and according to an exemplary method of the invention.

With reference first to FIG. 1 a filleting system 1 for a breast cap 2 of a chicken is shown. This filleting system 1 includes a conveyor system or line 3 incorporating carriers 4 for the breast cap 2, with at least one processing station 5 provided in or along the conveying path of the conveyor line 3 for processing the poultry or poultry parts. The manner in which the conveyor system or line 3 is constructed is entirely known to the person skilled in the art, hence a detailed illustration of this conveyor system or line 3 in the figures is dispensed with.

According to this exemplary embodiment of the invention, the processing station 5 is a cutting instrument 5 that is placed behind a fillet scraper. Such a fillet scraper is not shown in the figures since the manner in which a fillet scraper is embodied is also entirely known to the person skilled in the art, see for instance EP-B-1 454 531 the disclosure of which is entirely incorporated herein by reference.

FIG. 1 shows that the cutting instrument 5 is embodied with a cutting-edge or cutting edges 6, 7 which are arranged for cutting loose tissue connections that have remained between the carcass of the breast cap 2 and it's inner and outer fillets after passing the fillet scraper.

Figure 2:
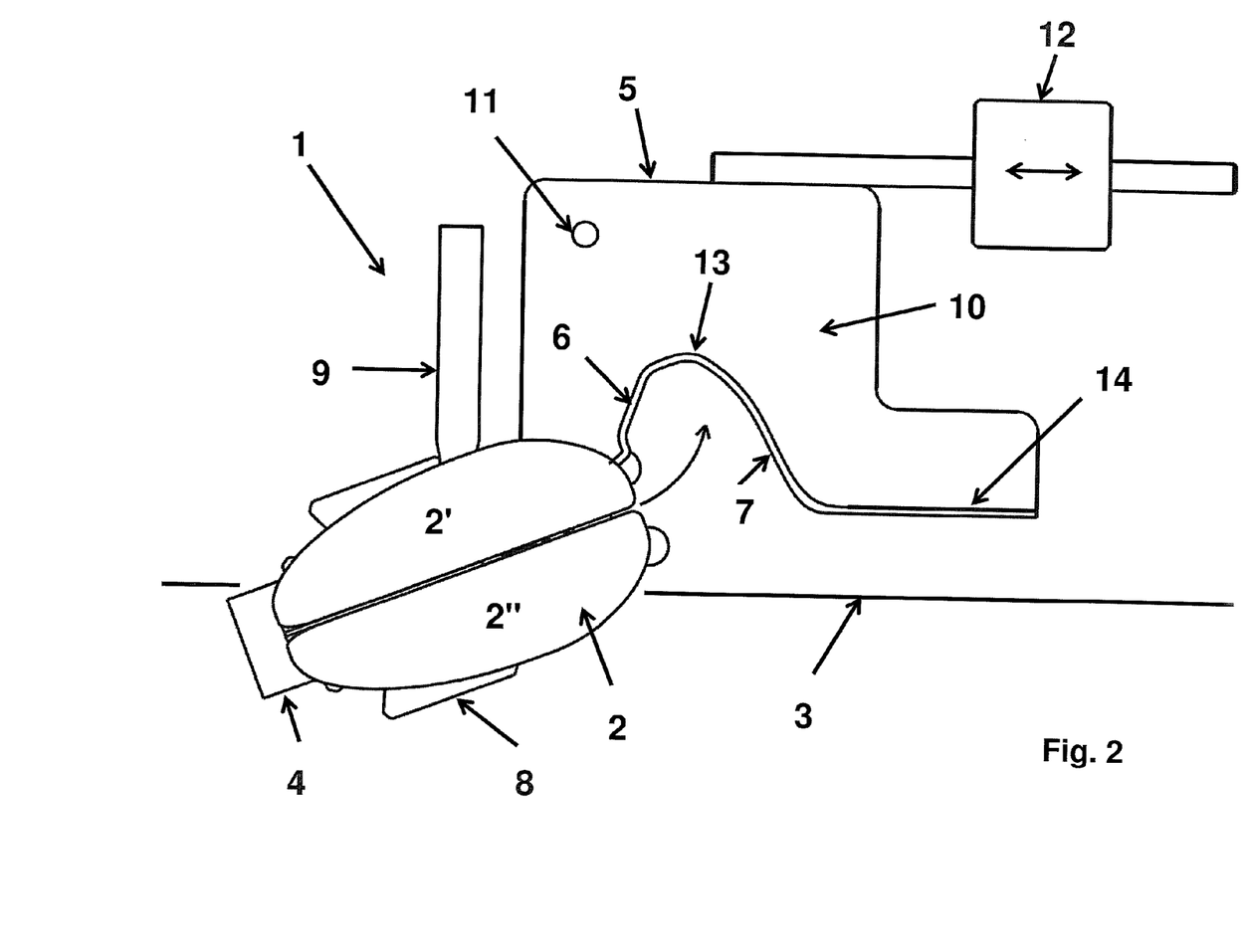

Doing a transitional view going from FIG. 1 to FIG. 2 reveals that the carriers 4 are rotatable. Further it is shown that the cutting instrument 5 is placed next to the conveying path or conveyor line 3 of said carriers 4. There are means 8, 9 in the form of a malthezer cross 8 that connects to the carrier 4, and a operating arm 9 that cooperates with the said malthezer cross 8 in order to rotate the carriers 4 at least in part, that is to say over 90°, while passing the processing station 5 so as to engage initially only the remaining tissue connections between the carcass and the inner and outer fillet on a first part 2' of the carcass with the cutting edge 6 or cutting edges of the cutting instrument 6, 7. This is shown in FIG. 2.

The figures further clearly show that the cutting instrument has two cutting edges 6, 7, each edge extending away from the path 3 of the carriers 4 and said cutting edges 6, 7 converging towards and into each other at a far end 13 from the conveying path 3 of the carriers 4.

As is mentioned above, FIG. 2 shows that the first cutting edge 6 of the two cutting edges 6, 7 is operative on the remaining tissue connections between the carcass and the inner and outer fillet on the first part 2' of the carcass after the carrier 4 is rotated at least in part while passing the processing station 5.

Figure 3:
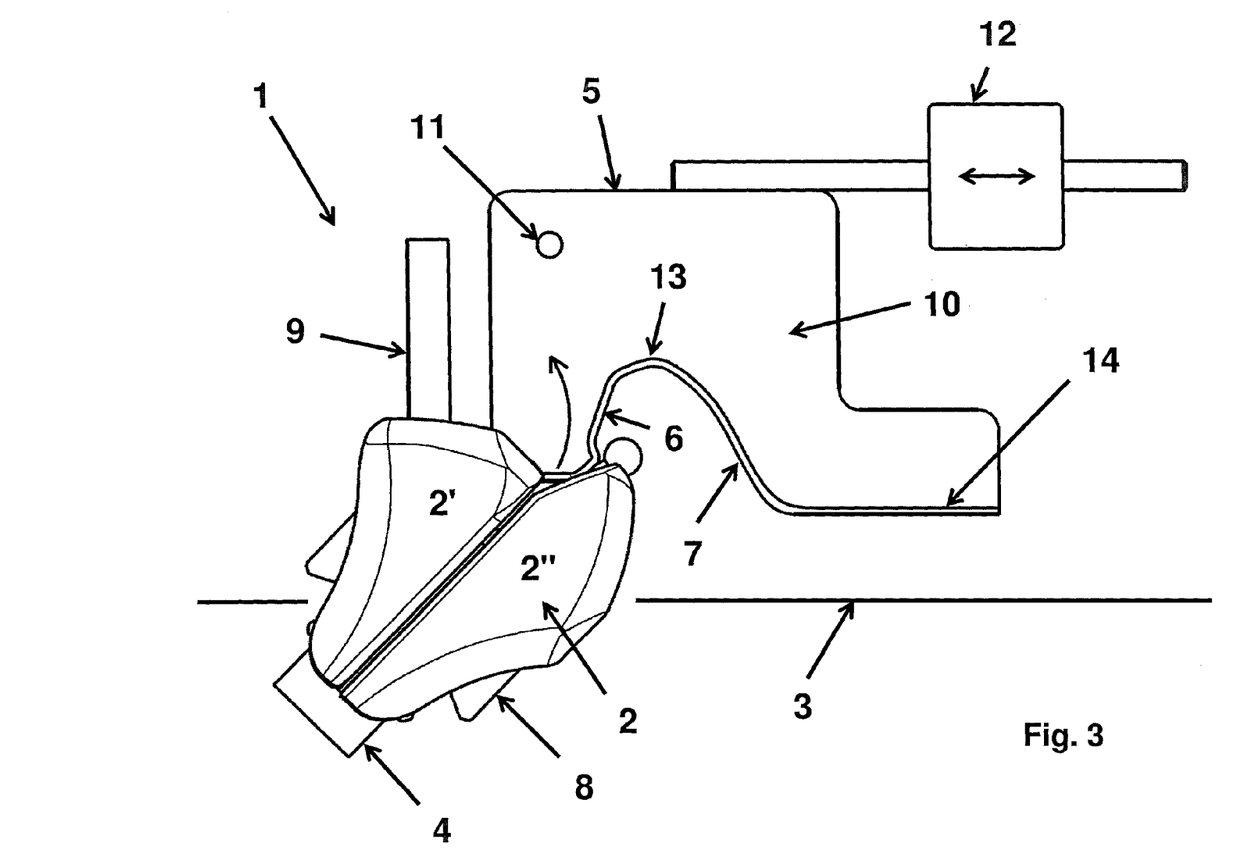
Figure 4:
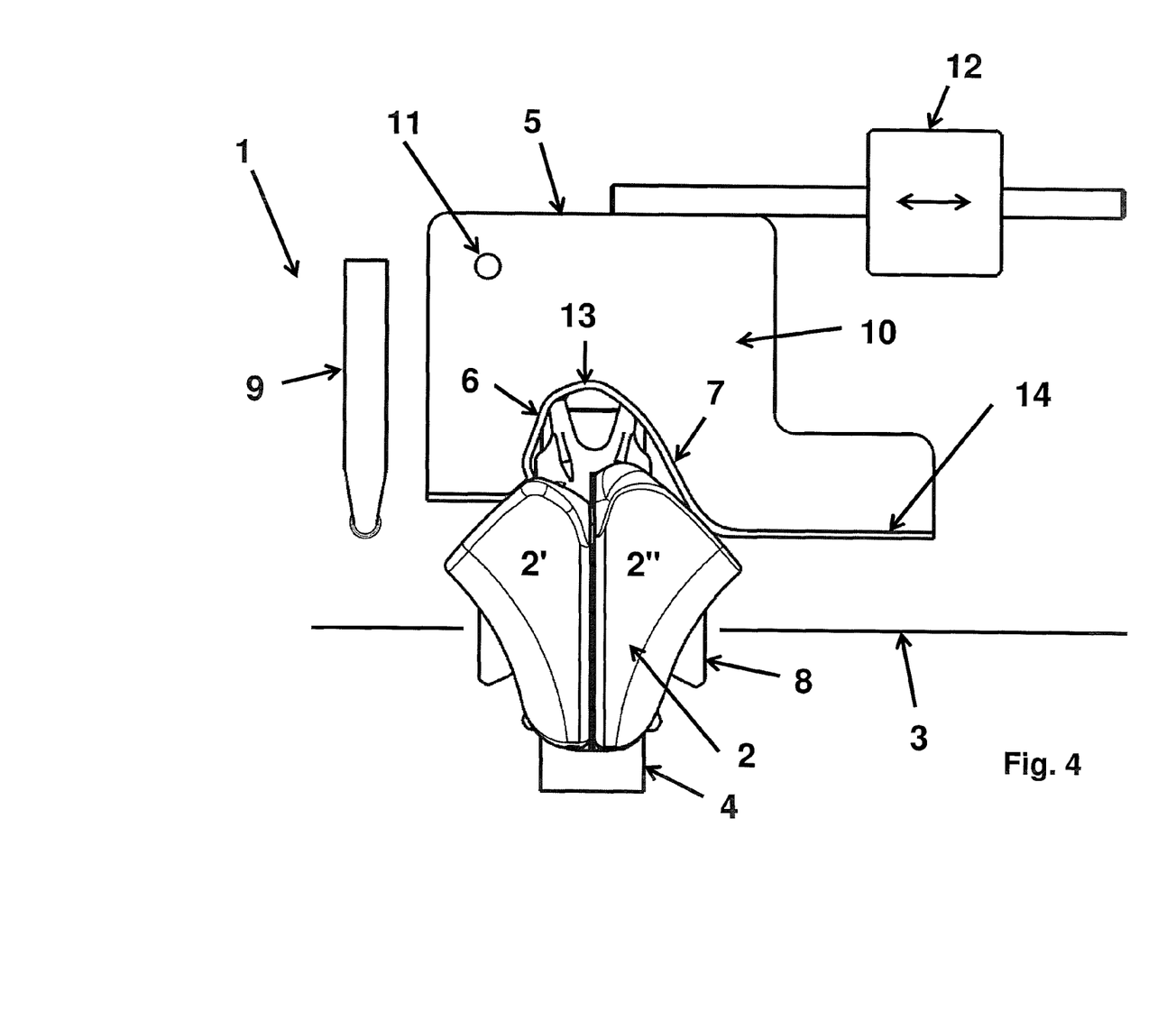

FIG. 4 shows that subsequent to the operation illustrated in FIG. 2 in which the first cutting edge 6 of the cutting instrument's cutting edges 6, 7 cuts the tissue connections between the carcass and inner and outer fillets on a first part 2' of the carcass, a second cutting edge 7 of the cutting edges 6, 7 is operative on the remaining tissue connections between the carcass and the inner and outer fillet on a second part 2" of the carcass, which second part 2" is adjacent to the first part 2' of the carcass. FIG. 3 shows an intermediate position of the carrier 4 while it is progressing to move from the operational position shown in FIG. 2 to the operational position shown in FIG. 4.

Figure 5A:
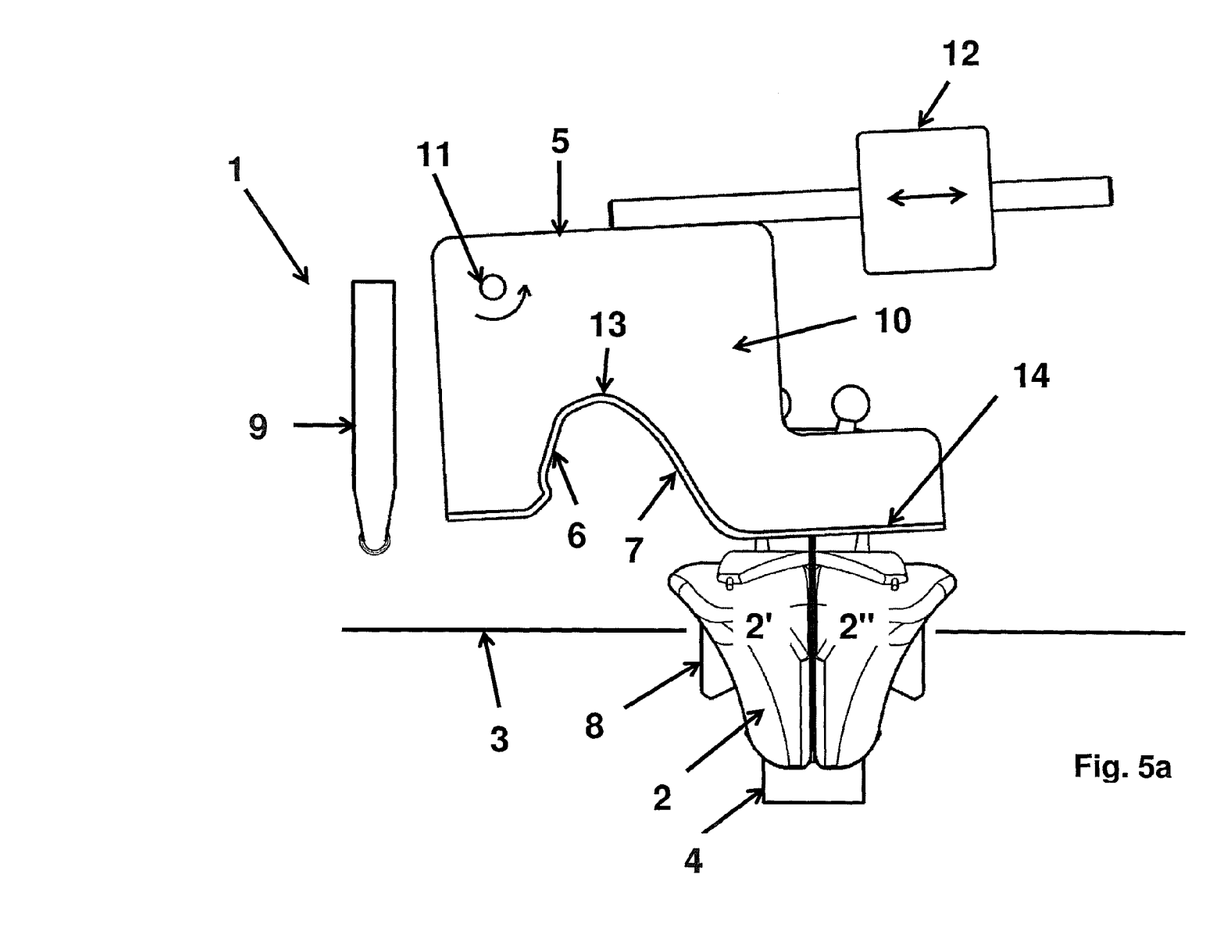
Figure 5B:
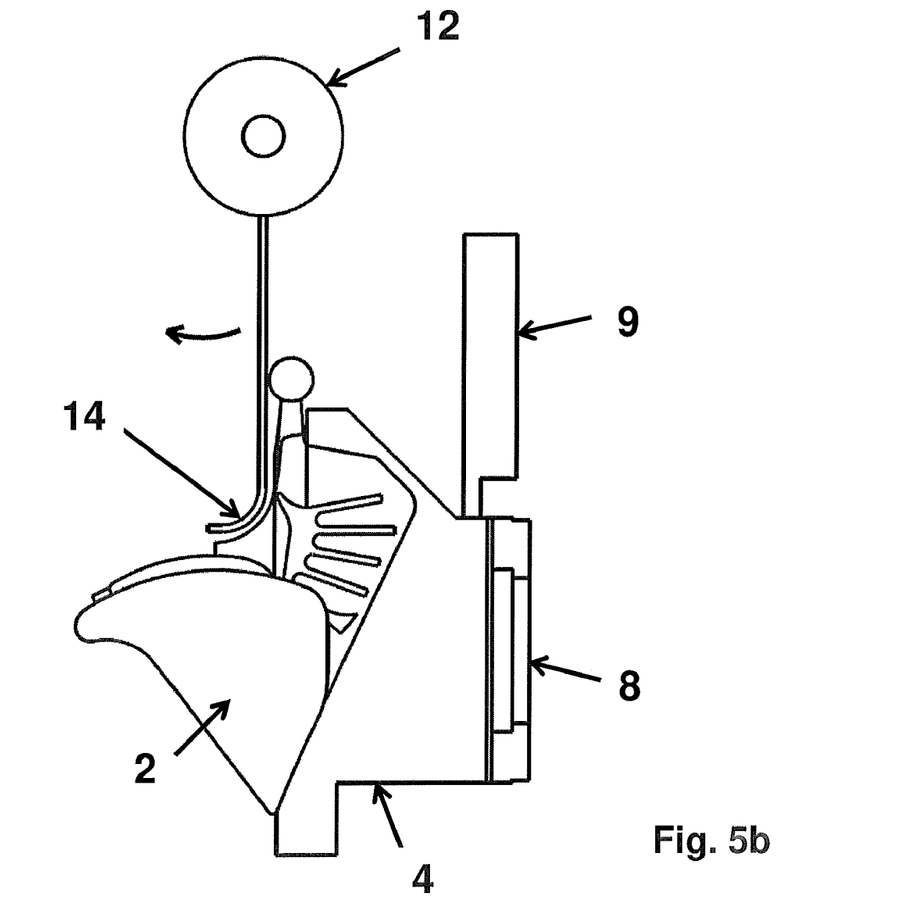

All figures further show, and in particular FIG. 5A shows that, viewed in the path 3 of the carriers 4, the cutting instrument 6, 7 is followed by a breastbone scraper 14. FIG. 5B provides a clear view on this breastbone scraper 14 which view is perpendicular to the side view shown in FIG. 5A.

From FIG. 5A and FIG. 5B in combination it is clear that the breastbone scraper 14 is designed as an elongated blade disposed longitudinally and parallel to the path 3 of the carriers 4, and that in a cross-sectional view as shown in FIG. 5B this blade 14 is round and adapted to the curve of the breastbone of the poultry.

The figures also show that the cutting instrument 6, 7 and the breastbone scraper 14 are embodied in a unitary device 10.

With reference to FIG. 5A and in particular by comparing FIG. 5A with any of its preceding figures, it is shown that the cutting instrument 6, 7 is supported such that it can be tilted to a limited extent due to the operation of the cutting instrument 6, 7 acting on the breast cap 2. This provides an effective self-adjusting possibility to the cutting instrument 6, 7. A slight upward tilting of the cutting instrument 6, 7 is shown in this FIG. 5A. The construction is such that downward tilting of the cutting instrument 6, 7 is not possible.

In order to arrange for the shown tilting possibility, the cutting instrument 6, 7 is mounted to the fixed world with a hinge connection 11. Further the cutting instrument 6, 7 is provided with means 12 for balancing the instrument, preferably a counterweight 12, which contributes further to the effective and well attuned self-adjusting possibility of the cutting instrument 6, 7. Preferably the counterweight is adjustable.

According to the invention a method for filleting poultry or poultry parts, such as chickens or chicken parts, is thus provided in which following the operation of a fillet scraper for scraping loose the inner and outer fillets from the carcass of the poultry or poultry part, the tissue connections that have remained between the carcass of the poultry or poultry part and it's inner and outer fillets are cut loose.

According to the invention it is essential that initially only the remaining tissue connections between the carcass and the inner and outer fillet on a first part 2' of the carcass are cut loose, and that subsequent to the cutting loose of these tissue connections between the carcass and inner and outer fillets on the first part 2' of the carcass, the remaining tissue connections between the carcass and the inner and outer fillet on a second part 2" of the carcass are cut loose, which second part 2" is adjacent to the first part 2' of the carcass.

Further preferably following the cutting loose of tissue connections between the carcass and the inner and outer fillets on both the first part 2' and the second part 2" of the carcass, a breastbone scraper 14 is operated for securing a complete detachment of the fillets from the carcass of the breast cap 2.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. A filleting system for poultry or poultry parts, the system comprising:
    a conveyor system incorporating carriers for the poultry or poultry parts, said conveyor system defining a conveying path;
    at least one processing station provided in or along the conveying path of the conveyor system and configured for processing the poultry or poultry parts:
    the processing station comprising:
        a cutting instrument that is placed following a fillet scraper, said cutting instrument including a cutting-edge or cutting edges for cutting loose tissue connections that have remained between the carcass of the poultry or poultry part and the inner and outer fillets after passing the fillet scraper, said cutting instrument positioned next to the conveying path of said carriers and having two cutting edges, each extending away from the conveying path of said carriers, said cutting edges converging towards and into each other at a far end from the path of said carriers.

2. A filleting system as in claim 1, further comprising:
    means to rotate said carriers at least in part while passing the processing station so as to engage initially only the remaining tissue connections between the carcass and the inner and outer fillet on a first part of the carcass with the cutting edge or cutting edges of said cutting instrument.

3. A filleting system as in claim 1, wherein said cutting instrument is configured such that subsequent to the cutting edge or cutting edges of said cutting instrument engaging the remaining tissue connections between the carcass and the inner and outer fillet on a first part of the carcass, said cutting instrument engages and cuts the remaining tissue connections between the carcass and the inner and outer fillet on a second part of the carcass, which second part is adjacent to the first part of the carcass.

4. A filleting system as in claim 1, wherein a first cutting edge of said cutting instrument's two cutting edges is operative on the remaining tissue connections between the carcass and the inner and outer fillet on the first part of the carcass after the carrier is rotated at least in part while passing the processing station.

5. A filleting system as in claim 1, wherein a second cutting edge of said cutting instrument's two cutting edges is configured such that subsequent to the operation of a first cutting edge of the cutting instrument's cutting edges on tissue connections between the carcass and inner and outer fillets on a first part of the carcass, the second cutting edge of said cutting edges is operative on the remaining tissue connections between the carcass and the inner and outer fillet on a second part of the carcass, which second part is adjacent to the first part of the carcass.

6. A filleting system as in claim 1, said cutting instrument is followed, along the conveying path, by a breastbone scraper.

7. A filleting system as in claim 6, wherein said cutting instrument and said breastbone scraper are embodied in a unitary device.

8. A filleting system as in claim 6, wherein said breastbone scraper is configured as an elongated blade disposed longitudinally and parallel to the conveying path of said carriers, and wherein said elongated blade, in a cross-section, is round and adapted to the curve of the breastbone of the poultry.

9. A filleting system as in claim 1, wherein said cutting instrument is supported such that it can be tilted to a limited extent due to the operation of the cutting instrument on the poultry or poultry part.

10. A filleting system as in claim 9, wherein said cutting instrument is mounted to the fixed world with a hinge connection.

11. A filleting system as in claim 9, wherein said cutting instrument is provided with means for balancing the instrument.

12. A method for filleting poultry or poultry parts, comprising the steps of:
    conveying the poultry or poultry parts in a conveyor system having carriers for the poultry or poultry parts and defining a conveying path, wherein at least one processing station is provided in or along the conveying path of the conveyor system for processing the poultry or poultry parts,
    operating a fillet scraper for scraping loose the inner and outer fillets from the carcass of the poultry or poultry part, the tissue connections that have remained between the carcass of the poultry or poultry part and their respective inner and outer fillets are cut loose; and,
    cutting loose the remaining tissue connections between the carcass and the inner and outer fillet on a second part of the carcass, which second part is adjacent to the first part of the carcass, after the cutting loose of tissue connections between the carcass and inner and outer fillets on a first part of the carcass.

13. A method for filleting poultry or poultry parts as in claim 12,
    operating a breastbone scraper for securing a complete detachment of the fillets from the carcass after the cutting loose of tissue connections between the carcass and the inner and outer fillets on both the first part and the second part of the carcass.

14. A cutting instrument for filleting poultry or poultry parts that have been processed by a fillet scraper, the cutting instrument having an outer circumference, the cutting instrument comprising:

two cutting-edges for cutting loose tissue connections that have remained between the carcass of the poultry or poultry part and their respective inner and outer fillets, said cutting edges converging towards and into each other and away from the outer circumference of said cutting instrument at a far end from the outer circumference of said cutting instrument.

15. A cutting instrument as in claim 14, wherein the cutting instrument is embodied in a unitary device with a breastbone scraper.

16. A cutting instrument as in claim 15, wherein said breastbone scraper is designed as an elongated blade which can be disposed longitudinally and parallel to a conveying path of a conveying system, and wherein said elongated blade, in a cross-sectional view, is round and adapted to the curve of the breastbone of the poultry.

17. A cutting instrument as in claim 14, wherein the cutting instrument includes a hinge connection for connection to a supporting construction.

18. A cutting instrument as in claim 14, wherein the cutting instrument is provided with counterweight means for balancing the cutting instrument.

* * * * *